United States Patent [19]
Fleming et al.

[11] Patent Number: 5,470,626
[45] Date of Patent: Nov. 28, 1995

[54] OPTICAL RECORDING LAYERS CONTAINING SULFUR

[75] Inventors: James C. Fleming, Webster; Gerald R. Lange; Donald R. Preuss, both of Rochester, all of N.Y.

[73] Assignee: Eastman Kodak Company, Rochester, N.Y.

[21] Appl. No.: 393,142

[22] Filed: Feb. 21, 1995

[51] Int. Cl.$^6$ ................................................ B32B 3/00
[52] U.S. Cl. ........................ 428/64.8; 428/457; 428/704; 430/270; 430/945
[58] Field of Search ............................. 369/284; 428/64, 428/704, 65, 457; 430/270, 945

[56] References Cited

U.S. PATENT DOCUMENTS

| | | | |
|---|---|---|---|
| 4,434,429 | 2/1984 | Terao et al. | 346/135.1 |
| 4,668,573 | 5/1987 | Terao et al. | 428/336 |
| 5,013,634 | 5/1991 | Nagai | 430/495 |

FOREIGN PATENT DOCUMENTS

| | | | |
|---|---|---|---|
| 61-114887 | 2/1986 | Japan | 428/64 |

*Primary Examiner*—B. Hamilton Hess
*Attorney, Agent, or Firm*—John R. Everett

[57] ABSTRACT

An optical recording element comprising, in the following order, a transparent substrate bearing an optical recording layer containing a phthalocyanine dye and a gold reflective layer characterized in that the recording layer comprises sufficient sulfur or sulfur compound to prevent defects in the gold reflective layer.

8 Claims, No Drawings

OPTICAL RECORDING LAYERS CONTAINING SULFUR

FIELD OF THE INVENTION

The present invention relates to optical recording elements, including recordable optical compact disks.

BACKGROUND OF THE INVENTION

A currently popular form of optical storage of information is the compact disk or CD. Digital information is stored in the form of low reflectivity marks or pits on an otherwise highly reflective background. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a metal, such as aluminum, to form a reflective layer and then with an optional protective layer. In those areas having the deformations or pits, the reflectivity is lower than in those areas not having the deformations.

Another CD storage element is recordable CD (CD-R). Recordable CD elements of this type are described in U.S. Pat. No. 4,940,618, European Patent Application 0,353,393 and Canadian Patent Application 2,005,520.

CD optical elements, including recordable CD elements, employing phthalocyanine dyes in the recording layer and gold as the reflector layer are particularly useful. The light stability of phthalocyanine dyes and the high reflectivity of gold are among the properties that render these materials of special value.

Although error correction codes are employed in recordable CD elements, it is important to prepare media substantially free of defects and to maintain the media in such a state through its lifetime so as to insure the integrity of the recorded data.

We have found that under certain conditions there is a tendency for recordable CD elements employing phthalocyanine dyes and a gold reflector layer to develop defects in the gold layer which range in size from 10 microns or less up to two hundred microns or more. Bits of information in CD-R media are of the order of one micron so that such defects can lead to a large loss of data and particularly when they are present at high areal densities. The defects are particularly prone to occur in recorded areas of the discs although they are observed in unrecorded media as well. High humidity is the environmental condition that most contributes to the defect growth and such is further aggravated at higher temperatures.

SUMMARY OF THE INVENTION

The present invention provides an optical recording element comprising, in the following order, a transparent substrate bearing an optical recording layer containing a phthalocyanine dye and a gold reflective layer characterized in that the recording layer comprises sufficient sulfur to prevent defects in the gold reflective layer.

We have discovered that the addition of sulfur in or on the dye layer provides for the stabilization of recordable CD elements employing phthalocyanine dyes and a gold reflector layer, against humidity induced defects in the gold layer. We know of no prior technology relating to the problem which this invention solves.

DETAILED DESCRIPTION OF THE INVENTION

After discovering the beneficial effects of sulfur in the present invention we have inferred that the beneficial effects of the addition of sulfur is related to the reactivity of sulfur and its compounds with gold and perhaps also related to the reactivity of sulfur with hydrocarbons such as in the vulcanization of rubber. Therefore, other additives that contain sulfur or are a source of sulfur should be effective in the prevention or alleviation of the gold defects. Useful sulfur containing compounds include mercaptans, disulfides, thioketones, and thioureas.

The phthalocyanine dyes of particular interest in formulating recordable CD elements having phthalocyanine recording layers are brominated alkoxyphthalocyanine dyes, described in European Patent Applications 0 451 718 A1, 0 519 419 A2, 0 513 370 A1 and 0 492 508 A1 and Canadian Patent Application 2005520 of Mitsui Toatsu Chemicals, Inc. A class of alkoxyphthalocyanine dyes is presented in the structure

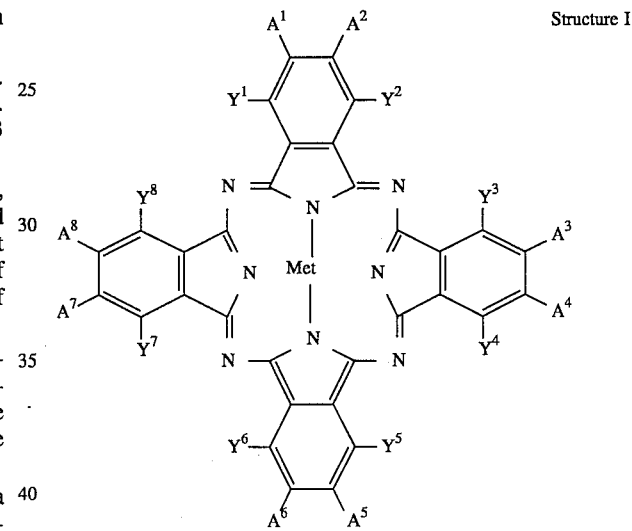

Structure I wherein each of $Y^1$, $Y^2$, $Y^3$, $Y^4$, $Y^5$, $Y^6$, $Y^7$, and $Y^8$ is hydrogen, an alkyl group, alkoxy group or alkylthio group; each of $A^1$, $A^2$, $A^3$, $A^4$, $A^5$, $A^6$, $A^7$ and $A^8$ is hydrogen, halogen, a nitro group, alkyl group, aralkyl group, alkenyl group, alkynyl group, alkoxy group, aryloxy group, alkylthio group or arylthio group; and Met represents two hydrogen atoms or a metal.

In structure I alkyl, alkoxy, alkenyl and alkynyl contains 1 to 20 carbon atoms (methyl, dodecyl, octadecyl, etc.). Aryl and ar- refers to phenyl, naphthyl, pyridyl, etc. Met represents Pd, Mg, Ni, Pt, etc.

The optical elements of the invention comprise a light transmitting, typically pregrooved substrate, a phthalocyanine dye light absorptive layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (n) of the unwritten light absorptive layer measured with 780 nm light source is not less than 1.8 and the imaginary part (k) is not greater than 0.15.

The substrate may be any transparent material that satisfies the mechanical and optical requirements. The substrates are generally pregrooved with groove depths from 20 nm to 250 nm, groove widths 0.2 to 1 μm and a pitch 1 to 2μm. The preferred material is polycarbonate, other materials are glass, polymethylmethacrylate and other suitable polymeric materials.

The preparation of the optical recording element of the invention is achieved by spin coating of the phthalocyanine dye by itself, or with other dye or dyes or with addenda from a suitable solvent onto a transparent substrate. For coating, the phthalocyanine dye with or without addenda is dissolved in a suitable solvent so that the dye is 20 or less parts by weight (g) to 100 parts of solvent by volume (mL). The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methoxy-2-propanol, methyl ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates.

One preferred protective layer is disclosed in commonly assigned U.S. Pat. No. 5,312,663, issued May 17, 1994 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating so recordable CD type elements are U.S. Pat. Nos. 5,009,818; 5,080,946; 5,090,009; 4,577,291; 5,075,147; and 5,079,135.

The following examples illustrate the utility of the solution provided by the present invention.

Recordable CD elements were prepared by spin coating a recording layer consisting of a mixture of phthalocyanine dyes dissolved in an organic solvent blend onto the grooved polycarbonate substrate. A gold reflective layer was then sputter coated on top of the recording layer, followed by a spin coated protective photoacrylic lacquer layer. The gold and lacquer layers were applied in a modified MFU 1000/ Uniline in-line audio compact disc (CD) manufacturing unit (First Light Technologies, Inc.). The sputtering was typically done at an argon flow of about 20 sccm and a power of 10 kW at 800 volts.

Three test bands, each four mm wide, of random EFM code were written on the discs at the optimum recording power (ORP) and at 15% above and 15% below it, respectively. Optimum recording power is the power at which one gets the desired duty cycle of recorded features. Typically, this is near 50% duty cycle. The recording was done with an experimental read/write test stand with a laser operating at 788 nm. The optimum recording power was typically at about 8 mW incident to the recordable CD element spinning at 2.8 m/s.

The recordable CD elements were incubated under various conditions of temperature and humidity. Examples include room temperature at 100% RH for 3 weeks and 80° C. at 100% RH for 24 hours. The elements were monitored microscopically for the appearance of the gold defects. The defects are readily observed by examining the recordable CD elements under oblique illumination through the substrate with a stereo microscope such as that manufactured by Leica under the trade name of StereoZoom 5. The defects appear as round sparkling bright spots with a tendency toward prominence in the overpowered band, though they may appear in the lower powers and even in unrecorded regions as well. Destructive analysis confirms that they are regions of degraded gold. The defects may also be observed by differential interference contrast microscopy by viewing through the lacquer layer.

The conditions under which the recordable CD elements prepared in the examples were kept are not necessarily considered to be those to which actual media might be subjected but are considered as accelerated keeping tests, the results from which are considered to be indicative of the sort of problems that one might encounter under more realistic keeping for longer periods of time and lower temperatures and/or humidities.

The dye used in the experiments consists of an amorphous mixture of variably brominated tetraalkoxy isomers of palladium phthalocyanine dyes as represented by Structure II and as described in the above mentioned European Patent Applications.

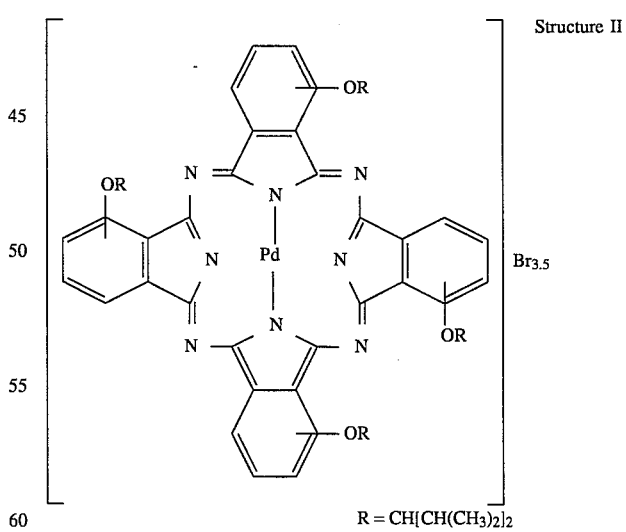

Structure II

R = CH[CH(CH₃)₂]₂

EXAMPLE 1

A solution (Solution A) of 690 mg of the phthalocyanine dye mixture of Structure II in 30 ml of a blend of ethylcyclohexane and dioxane (9:1 volume ratio) was prepared. A second solution (Solution B) was prepared in identical fashion except that it additionally contained 34.5 mg (5.0% relative to dye) of sublimed sulfur. The solutions were each spin coated onto polycarbonate substrates having tracking grooves approximately 140 nm deep molded therein. The thickness of the coatings was such as to provide an optical density of 0.31 at a wavelength of 671 nm.

The dye coatings were sputter coated on the Uniline machine with about 60 nm of gold.

A protective lacquer layer about 4 microns thick was then applied by spin coating a photoacrylic solution (Daicure SD-17, Dainippon Ink and Chemicals, Inc.) followed by photocuring.

Duplicate discs of the two formulations were recorded on and the written media were subjected to 24 hours of keeping at 80° C. and 100% relative humidity. Under these conditions the control discs made from Solution A developed thousands of the gold defects while none was observed in the discs containing sulfur prepared from Solution B.

EXAMPLE 2

A series of four solutions of the dye of Structure II was prepared as in Example 1. The solutions differed only in that the concentration of sulfur was set at 0.0, 1.0, 2.0 and 4.0%, respectively, relative to the dye. As in Example 1 the solutions were spin coated onto polycarbonate substrates followed by finishing through the protective lacquer layer and writing on the discs.

Duplicate copies of the four recordable CD element formulations were subjected to 24 hours of keeping at 80° C. and 100% relative humidity. The two discs without sulfur present showed none of the defects in the unwritten areas but exhibited many fields of the gold defects, about 40 microns in diameter, in the written areas of the discs though one of the recordable CD elements had no defects in the band written 15% below the optimum recording power. None of the six recordable CD elements with sulfur present in the dye layer showed any of the gold defects in written or unwritten areas of the media.

One each of the four disc formulations was kept at room temperature and 100% relative humidity for 8 weeks. Multitudes of gold defects developed in the band written at 15% over the optimum recording power in the recordable CD elements which did not contain sulfur. The three recordable CD elements with sulfur present exhibited none of these defects.

EXAMPLE 3

A series of five solutions of a dye of Structure II from Dye Lot 1 was prepared as in Example 1. The solutions differed only in that the concentration of sulfur was set at from 0.00 to 1.00% sulfur relative to the dye as seen in Table 1. A second set of two solutions was prepared from Dye Lot (2) of the same general structure of Dye Lot 1, but of modified isomer content, and sulfur was added at 0.50% to one of the solutions, again as represented in Table 1. As in Example 1 all of the solutions were spin coated onto polycarbonate substrates followed by finishing the recordable CD elements through the protective lacquer layer and then writing on the recordable CD elements.

The written recordable CD elements were subjected to 24 hours of keeping at 800° C. and 100% relative humidity and then studied microscopically for the appearance of gold defects in the recordable CD elements. The results are presented in Table 1. It was observed that the gold defects were substantially eliminated at concentrations above 0.1% sulfur and even at 0.1% sulfur the defects were eliminated in unwritten areas, reduced in frequency in the underpowered band, and were only about 10 microns in diameter in the other bands, significantly smaller than in the absence of sulfur.

TABLE 1

| | | Gold Defects in Recordable CD Elements | | | | |
|---|---|---|---|---|---|---|
| Disc # | Dye lot | Added sulfur | Un-written | ORP[1] −15% | ORP[1] | ORP[1] +15% |
| 1-a | 1 | None | few | 1000's | 1000's | 1000's |
| 1-b | " | " | few | 1000's | 1000's | 1000's |
| 1-c | " | " | few | 1000's | 1000's | 1000's |
| 1-d | " | " | few | 1000's | 1000's | 1000's |
| 2-a | " | 0.01% S | few | 1000's | 1000's | 1000's |
| 2-b | " | " | few | 1000's | 1000's | 1000's |
| 3-a | " | 0.1% S | none | none | 1000's | 1000's |
| 3-b | " | " | none | 100's | 1000's | 1000's |
| 4-a | " | 0.5% S | none | none | none | none |
| 4-b | " | " | none | none | none | none |
| 5-a | " | 1.0% s | none | none | none | none |
| 5-b | " | " | none | none | none | none |
| 6-a | 2 | None | few | 1000's | 1000's | 1000's |
| 6-b | " | " | few | 1000's | 1000's | 1000's |
| 7-a | " | 0.5% S | none | none | none | none |
| 7-b | " | " | none | none | none | none |

[1]refers to optimum recording power

The sulfur or sulfur containing reagents need not be added to the coating solution directly but could be applied after the dye layer is coated such as by fuming the dye layer with sulfur or a suitable substitute or by coating an additional thin layer containing the reagent over the dye layer.

The invention has been described in detail with particular reference to preferred embodiments thereof, but it will be understood that variations and modifications can be effected within the spirit and scope of the invention.

We claim:

1. An optical recording element comprising, in the following order, a transparent substrate bearing an optical recording layer containing a phthalocyanine dye and a gold reflective layer characterized in that the recording layer comprises sufficient sulfur to prevent defects in the gold reflective layer.

2. The element of claim 1 wherein the sulfur resides on or near the surface of the dye layer adjacent to the gold reflective layer.

3. The element of claims 1 or 2 wherein the sulfur is present in an amount of 0.001 to 5.0 weight percent relative to the dye in the layer.

4. The element of claim 1 or 2 wherein the phthalocyanine dye has the structure:

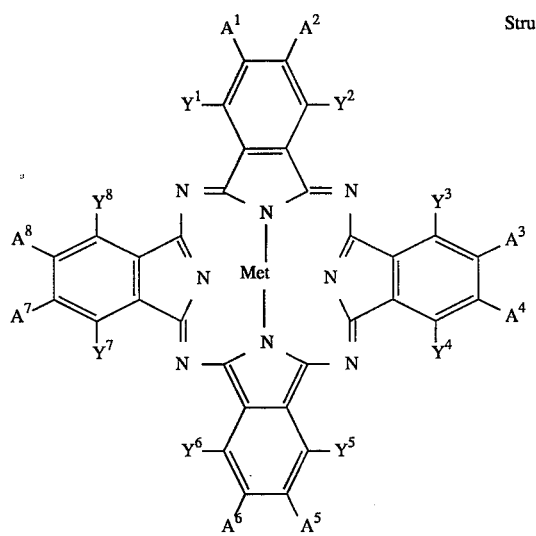

Structure I

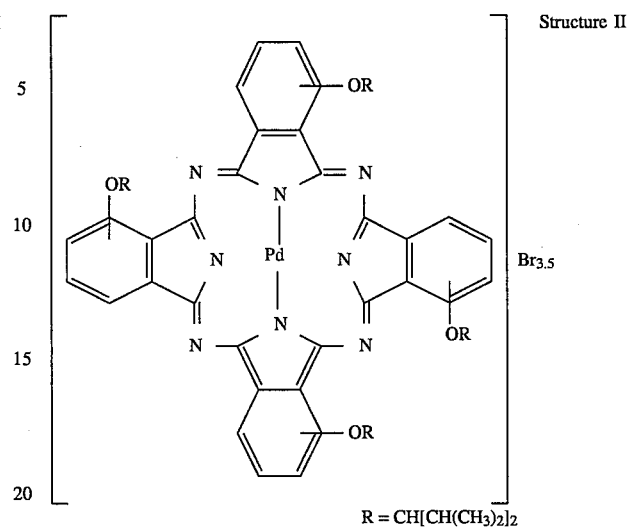

Structure II

R = CH[CH(CH$_3$)$_2$]$_2$ wherein each of $Y^1$, $Y^2$, $Y^3$, $Y^4$, $Y^5$, $Y^6$, $Y^7$, and $Y^8$ is hydrogen, an alkyl group, alkoxy group or alkylthio group; each of $A^1$, $A^2$, $A^3$, $A^4$, $A^5$, $A^6$, $A^7$ and $A^8$ is hydrogen, halogen, a nitro group, alkyl group, aralkyl group, alkenyl group, alkynyl group, alkoxy group, aryloxy group, alkylthio group or arylthio group; and Met represents two hydrogen atoms or a metal.

5. The element of claim 4 wherein the phthalocyanine dye is

6. The element of claim 4 wherein the sulfur in the layer is derived from a sulfur containing compound.

7. The element of claim 6 wherein the sulfur compound is selected from the group consisting of mercaptans, disulfides, thioketones and thioureas.

8. The element of any one of claims 1 or 2 wherein the optical recording element is a recordable compact disc.

\* \* \* \* \*